United States Patent
Buttolo et al.

(10) Patent No.: US 10,363,817 B2
(45) Date of Patent: Jul. 30, 2019

(54) SELF-LOADING AUTONOMOUS VEHICLE

(71) Applicant: Ford Global Technologies, LLC, Dearborn, MI (US)

(72) Inventors: Pietro Buttolo, Dearborn Heights, MI (US); Stuart C. Salter, White Lake, MI (US); Annette Lynn Huebner, White Lake, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 15/647,761

(22) Filed: Jul. 12, 2017

(65) Prior Publication Data

US 2019/0016217 A1 Jan. 17, 2019

(51) Int. Cl.
*B60K 31/00* (2006.01)
(52) U.S. Cl.
CPC ...... *B60K 31/00* (2013.01); *B60K 2031/0025* (2013.01); *B60K 2031/0033* (2013.01)
(58) Field of Classification Search
None
See application file for complete search history.

(56) References Cited

U.S. PATENT DOCUMENTS

| 6,765,495 | B1 | 7/2004 | Dunning et al. | |
|---|---|---|---|---|
| 9,139,199 | B2 | 9/2015 | Harvey | |
| 9,384,666 | B1 | 7/2016 | Harvey | |
| 2015/0149022 | A1* | 5/2015 | Harvey | E04H 6/422 701/23 |
| 2015/0370255 | A1* | 12/2015 | Harvey | B62D 15/0285 701/24 |
| 2016/0171894 | A1* | 6/2016 | Harvey | G05D 1/0088 701/23 |
| 2018/0326594 | A1* | 11/2018 | McCollum | B25J 15/0014 |

FOREIGN PATENT DOCUMENTS

DE   102014224092 A1   6/2016
DE   102015202468 A1   8/2016

* cited by examiner

*Primary Examiner* — Mussa A Shaawat
*Assistant Examiner* — Abdhesh K Jha
(74) *Attorney, Agent, or Firm* — Frank A. Mackenzie; Bejin Bieneman PLC

(57) ABSTRACT

A vehicle computer includes a memory a processor programmed to execute instructions stored in the memory. The instructions include commanding a lighting system controller to flash tail lamps of a host vehicle toward a follow vehicle immediately behind the host vehicle, receiving a response from the follow vehicle, and commanding the host vehicle to autonomously proceed to a loading area upon receipt of the response from the follow vehicle.

17 Claims, 7 Drawing Sheets

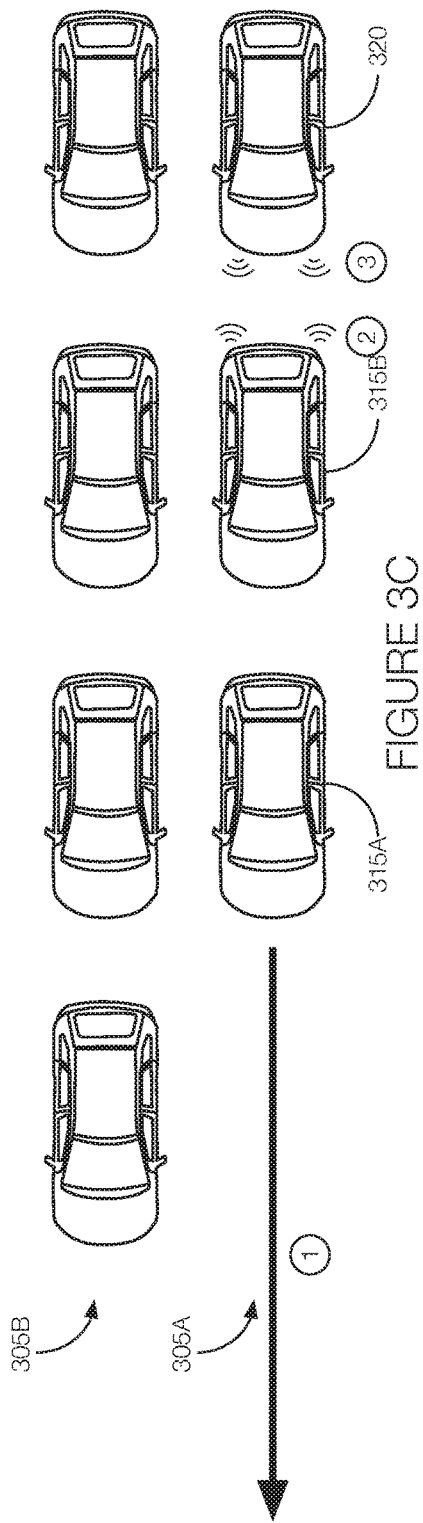
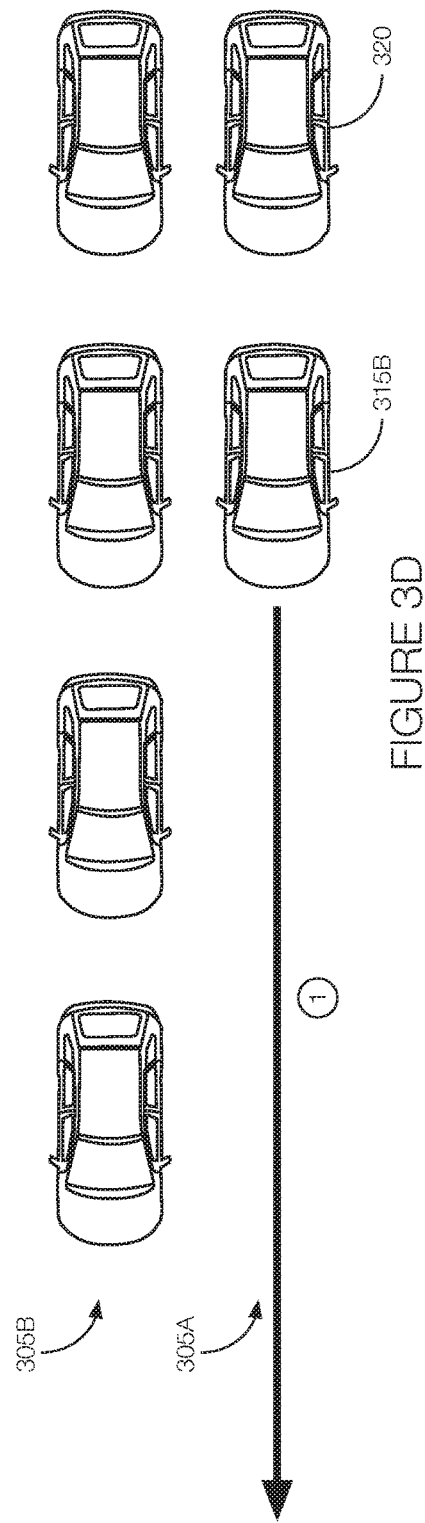

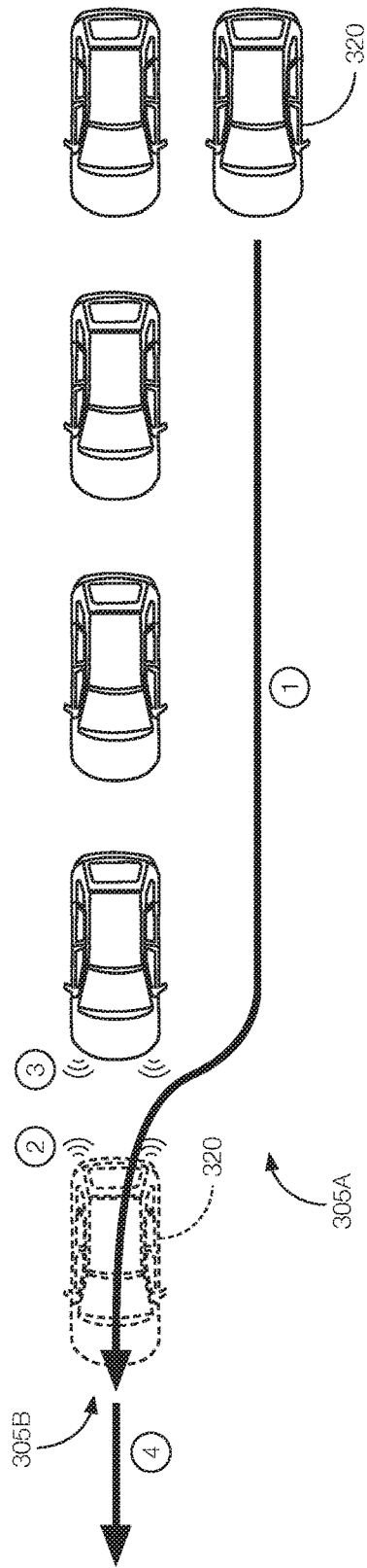
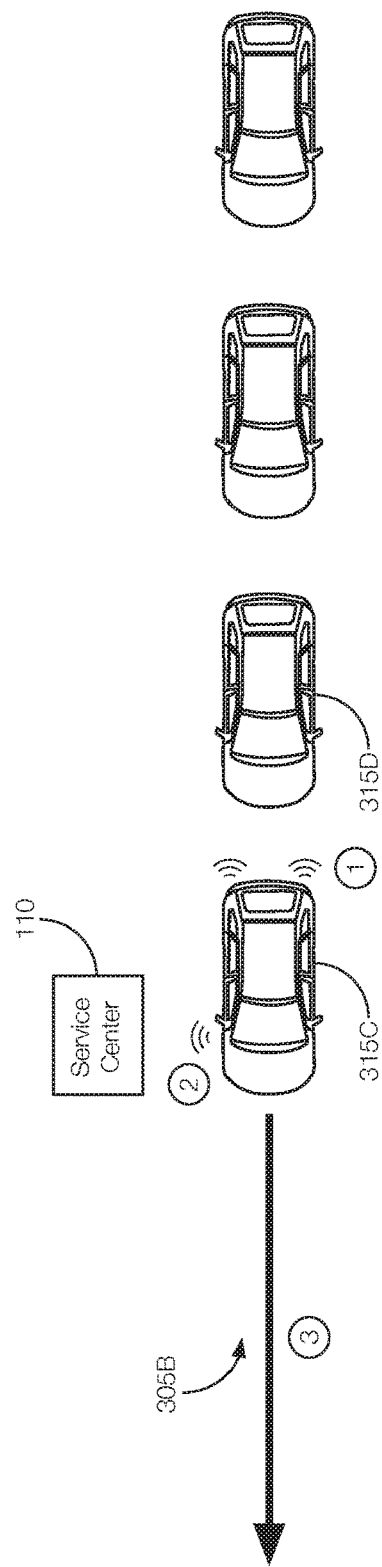

SELF-LOADING AUTONOMOUS VEHICLE

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

BRIEF DESCRIPTION OF THE DRAWINGS

FIGS. 3A-3F illustrate a parking lot where autonomous vehicles equipped with the self-loading sequence system proceed to the truck or train according to the sequence.

DETAILED DESCRIPTION

Figure 1:
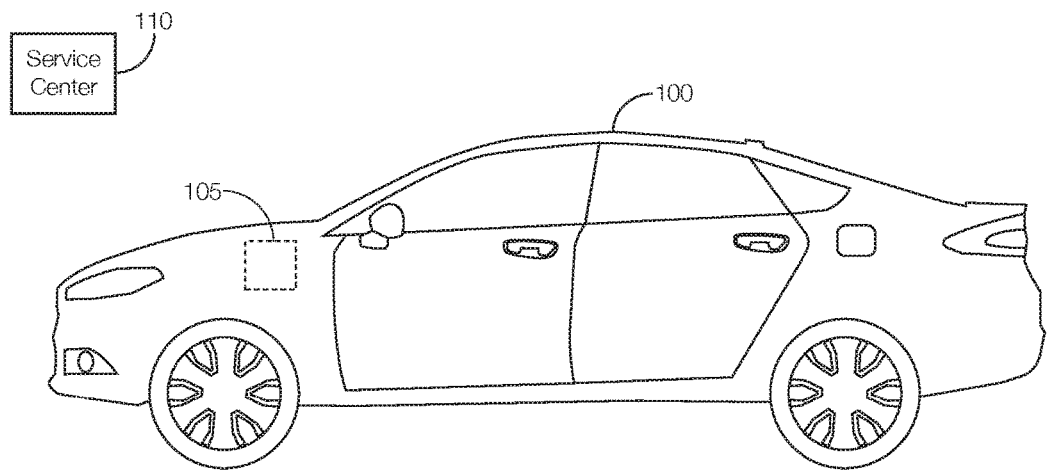
FIG. 1 illustrates an example autonomous vehicle with a self-loading sequence system for self-loading onto a truck or train according to a particular sequence relative to other autonomous vehicles.

Transferring fleet vehicles often involves loading the vehicles onto a truck or train. With non-autonomous vehicles, a person must drive each vehicle onto a loading ramp and onto the truck or train car. This takes a considerable amount of time and coordination among the people driving the vehicles.

An autonomous vehicle can drive itself onto the truck or train car. This still requires a considerable amount of coordination with other autonomous vehicles. Further, an autonomous vehicle that cannot load itself onto the truck or train car may interrupt the loading process until a person can investigate the issue, move the offending autonomous vehicle out of the way of other vehicles, or the like.

One way for a fleet of autonomous vehicles to drive themselves onto the truck or train car involves incorporating a self-loading sequence system into each autonomous vehicle. The system may be implemented via a vehicle computer having a memory and a processor programmed to execute instructions stored in the memory. The instructions include commanding a lighting system controller to flash tail lamps of a host vehicle, determining whether a response was received from a first follow vehicle located behind the host vehicle, and commanding the host vehicle to autonomously proceed to a loading area as a result of receiving the response from the first follow vehicle.

The instructions may further include detecting a sign with a code or symbol and determining that the host vehicle is a lead vehicle in a row of vehicles upon detecting the sign. In that instance, the instructions may further include commanding the lighting system controller to flash the tail lamps of the host vehicle toward the first follow vehicle after detecting the sign.

Receiving the response from the first follow vehicle includes receiving an image captured by a camera of the host vehicle and processing the image. In that implementation, the instructions may further include determining, as a result of processing the image, that the first follow vehicle responded by flashing its front lamps in a predetermined pattern.

The instructions may further include waiting a predetermined amount of time for the response from the first follow vehicle and determining whether the first follow vehicle did not respond within the predetermined amount of time. In that possible approach, the instructions may further include transmitting a notification to a service center indicating that the follow vehicle is unable to proceed to a loading area as a result of determining that the first follow vehicle did not respond within the predetermined amount of time. The instructions may further include commanding the host vehicle to autonomously proceed to the loading area after transmitting the notification.

The instructions may further include confirming whether the first follow vehicle is located behind the host vehicle. Confirming whether the first follow vehicle is located behind the host vehicle may include determining whether the first follow vehicle is located behind the host vehicle based on images captured by a camera of the host vehicle with a view of an area behind the host vehicle. Further, the instructions may include determining that the host vehicle is last in a row of vehicles if the first follow vehicle is not located behind the host vehicle. The instructions may further include detecting whether an adjacent row of vehicles is present next to the host vehicle if the first follow vehicle is not located behind the host vehicle. Moreover, the instructions may further include commanding the host vehicle to autonomously navigate to a front of the adjacent row of vehicles after detecting the adjacent row of vehicles. In addition, the instructions may further include commanding the lighting system controller of the host vehicle to flash the tail lamps of the host vehicle toward a second follow vehicle in the adjacent row of vehicles after arriving at the front of the adjacent row of vehicles. The instructions may further include waiting for a response from the second follow vehicle in the adjacent row of vehicles. This may include instructions for detecting the response from the second follow vehicle within a predetermined amount of time. This may also include instructions for commanding the host vehicle to autonomously proceed to a loading area upon receipt of the response from the second follow vehicle.

The elements shown may take many different forms and include multiple and/or alternate components and facilities. The example components illustrated are not intended to be limiting. Indeed, additional or alternative components and/ or implementations may be used. Further, the elements shown are not necessarily drawn to scale unless explicitly stated as such.

As illustrated in FIG. 1, an autonomous host vehicle 100 with a self-loading sequence system 105 allows the host vehicle 100 to load itself into a truck, train car, shipping container, etc., according to a particular sequence relative to other autonomous vehicles. Although illustrated as a sedan, the host vehicle 100 may be any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. Further, depending on where the host vehicle 100 is located in, e.g., a parking queue waiting to proceed to a loading area where it can load itself into the truck, train car, shipping container, etc., the host vehicle 100 may be a "lead vehicle," which is the first vehicle in a row of vehicles, a "follow vehicle," which is a vehicle other than the lead vehicle, or a "last vehicle," which is the follow vehicle that is last in the row of vehicles.

The self-loading sequence system 105 helps the host vehicle 100 determine when it should proceed to the loading area. As discussed in greater detail below, the self-loading sequence determines whether the host vehicle 100 is a lead vehicle, a follow vehicle, or the last vehicle in the row. If it determines that it is the first vehicle, the self-loading sequence system 105 flashes its rear lights to the follow vehicle immediately behind the host vehicle 100. The self-loading sequence system 105 waits for a response from the follow vehicle. Upon receiving the response, the self-loading sequence system 105 instructs the host vehicle 100 to proceed to the loading area. If the response is not received within a certain period of time, the self-loading sequence system 105 determines if a follow vehicle is present. If a follow vehicle is not present, the self-loading sequence system 105 may determine that it is the last vehicle in the row and proceed accordingly, as discussed in greater detail below. If a follow vehicle is present, the self-loading sequence system 105 may determine that the follow vehicle may be malfunctioning and not able to self-load. Thus, the self-loading sequence system 105 notifies a service center 110 that the follow vehicle needs service before it can proceed to the loading area and complete self-loading. In some instances, if the follow vehicle is positioned in a way that prevents other vehicles in the row from proceeding to the loading area, the host vehicle 100 may proceed as though it is the last vehicle in the row.

If the self-loading sequence system 105 determines that the host vehicle 100 is the follow vehicle, the self-loading sequence system 105 may wait for a signal from the vehicle immediately ahead of the host vehicle 100. That is, the self-loading sequence system 105 may wait for the vehicle immediately ahead of the host vehicle 100 to flash its rear lights. The self-loading sequence system 105 may respond by having the host vehicle 100 flash its headlights. Then, the self-loading sequence system 105 may flash its rear lights as a signal to the vehicle located directly behind the host vehicle 100. Once the vehicle directly behind the host vehicle 100 responds, the self-loading sequence system 105 may allow the host vehicle 100 to proceed to the loading area. Further, the self-loading sequence system 105 may determine if the vehicle immediately behind the host vehicle 100 responded to the flashing rear lights. If not, the self-loading sequence system 105 may determine if another follow vehicle is present. If another follow vehicle is not present, the self-loading sequence system 105 may determine that it is the last vehicle in the row and proceed accordingly, as discussed in greater detail below. If another follow vehicle is present, the self-loading sequence system 105 may determine that the follow vehicle may be malfunctioning and not able to self-load. Thus, the self-loading sequence system 105 may notify the service center 110 that the other follow vehicle needs service before it can proceed to the loading area and complete self-loading. In some instances, if the other follow vehicle is positioned in a way that prevents other vehicles in the row from proceeding to the loading area, the host vehicle 100 may proceed as though it is the last vehicle in the row.

When the host vehicle 100 is operating as the last vehicle in the row, which may occur after the host vehicle 100 receives the signal from the follow vehicle immediately ahead of the host vehicle 100 and after the self-loading sequence system 105 determines that there are no other follow vehicles behind the host vehicle 100 in the row. Also, as mentioned above, the host vehicle 100 may operate as the last vehicle in the row if the vehicle immediately behind the host vehicle 100 has malfunctioned and is blocking the way of other vehicles. To operate the host vehicle 100 as the last vehicle in the row, the self-loading sequence system 105 may determine if an adjacent row of vehicles is present. If so, rather than proceed to the loading area, the self-loading sequence system 105 may cause the host vehicle 100 to drive to the front of the adjacent row. From that location, the self-loading sequence system 105 may operate as the lead vehicle for the adjacent row. If no adjacent row is present, the self-loading sequence system 105 may cause the host vehicle 100 to proceed to the loading area.

Figure 2:
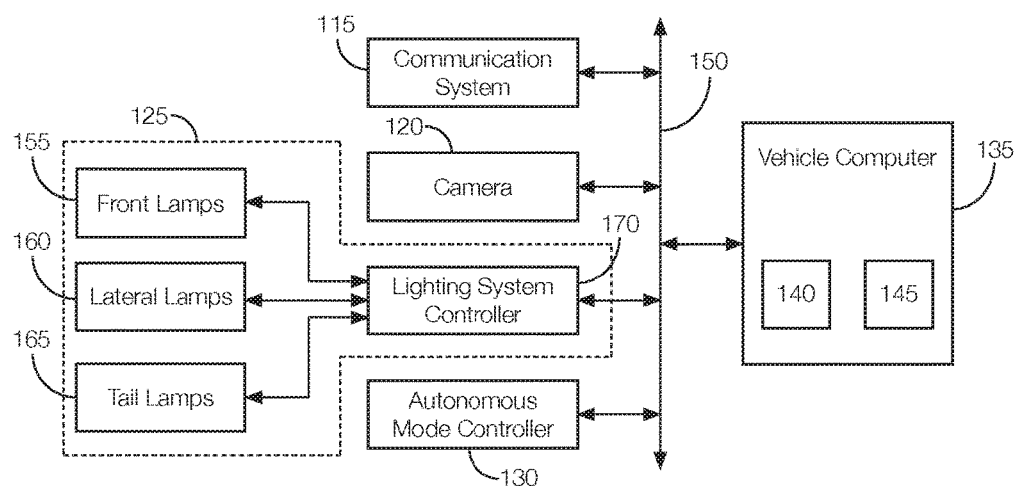
FIG. 2 is a block diagram showing example components of the autonomous vehicle with the self-loading sequence system.

Referring now to FIG. 2, components of the self-loading sequence system 105 may communicate with components of the host vehicle 100 such as a vehicle communication system 115, a camera 120 or other vision sensor, an exterior lighting system 125, and an autonomous mode controller 130. The self-loading sequence system 105 may be implemented via a vehicle computer 135 with a memory 140 and a processor 145. A communication network 150 that includes hardware, such as a communication bus, may facilitate communication among at least some of the components shown in FIG. 2. The communication network 150 may facilitate wired or wireless communication among the vehicle components in accordance with a number of communication protocols such as controller area network (CAN), Ethernet, WiFi, Local Interconnect Network (LIN), and/or other wired or wireless mechanisms.

The communication system 115 is implemented via an antenna, circuits, chips, or other electronic components that facilitate wireless communication between the host vehicle 100 and the service center 110. The communication system 115 may be programmed to communicate in accordance with any number of wired or wireless communication protocols. For instance, the communication system 115 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, the Dedicated Short Range Communication (DSRC) protocol, etc. In some instances, the communication system 115 is incorporated into a vehicle telematics unit. The communication system 115 may be programmed to transmit messages to the service center 110 upon instruction from, e.g., the processor 145. The message may indicate that a vehicle behind the host vehicle 100 may not be able to proceed to the loading area.

The camera 120 is a vision sensor. The camera 120 may capture images of an area ahead of the host vehicle 100, behind the host vehicle 100, or next to the host vehicle 100, depending on where the camera 120 is located. To capture such images, the camera 120 may include a lens that projects light toward, e.g., a CCD image sensor, a CMOS image sensor, etc. The camera 120 processes the light and generates the image, which could be a still image or a video stream. The image may be output to the processor 145 and, as discussed in greater detail below, can be used to determine if a vehicle is present behind the host vehicle 100 or if there is an adjacent row of vehicles relative to the host vehicle 100. The camera 120 may further capture images indicating that the vehicle ahead of or behind the host vehicle 100 is flashing various lights as a signal to the host vehicle 100. In one possible implementation, the camera 120 may capture an image of a sign or other object used to indicate that the host vehicle 100 is the "lead vehicle." The sign may have a particular symbol, such as the number "1," or code similar to a bar code or QR code, that appear in the image. The markings may be visible or invisible to the naked eye. An example of an invisible marking may include a marking that is visible to, e.g., an infrared camera 120 but not visible to a human. In some instances, a lidar sensor may be used instead of a camera 120.

The exterior lighting system 125 may include any light source located on the exterior of the host vehicle 100. The exterior lighting system 125 may include "front lamps 155" such as headlamps or auxiliary lamps (such as fog lamps). The exterior lighting system 125 may include "lateral lamps 160" such as turn lamps or puddle lamps. The exterior lighting system 125 may include "tail lamps 165" such as brake lights or reverse lamps. Besides light sources, the exterior lighting system 125 may further a lighting system controller 170 programmed to control the light sources according to signals received from, e.g., the processor 145. For instance, the lighting system controller 170 may output signals to illuminate some or all tail lamps 165 in a predetermined pattern as a signal to the vehicle behind the host vehicle 100. The lighting system controller 170 may output signals to illuminate some or all front lamps 155 as a signal to the vehicle ahead of the host vehicle 100.

The autonomous mode controller 130 is a microprocessor-based controller implemented via circuits, chips, or other electronic components. The controller 130 may include a processor, memory, etc. The memory of the controller 130 may include memory for storing instructions executable by the processor of the autonomous mode controller 130 as well as for electronically storing data and/or databases. The autonomous mode controller 130 is programmed to autonomous control the host vehicle 100. Autonomously controlling the host vehicle 100 may include the autonomous mode controller 130 receiving signals from various sensors, such as the camera 120 or lidar sensor discussed above, processing those signals, and outputting control signals to actuators that can control the steering, braking, and acceleration of the host vehicle 100. The autonomous mode controller 130 may further output the control signals in accordance with signals output by a vehicle navigation system.

The vehicle computer 135 includes a memory 140 and a processor 145, which may be the same or different from the memory and processor of the autonomous mode controller 130. The memory 140 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 140 may store instructions executable by the processor 145 as well as other data. The instructions and data stored in the memory 140 may be accessible to the processor 145 and possibly other components of the self-loading sequence system 105, the host vehicle 100, or both.

The processor 145 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 145 can receive images or other outputs from the camera 120 and can facilitate, from the images or other outputs, self-loading according to where the host vehicle 100 is located relative to other autonomous vehicles.

That is, the processor 145 may be programmed to determine if the host vehicle 100 is first in a sequence of vehicles. To do so, the processor 145 may process the image output by the camera 120 and determine whether the image contains a particular symbol or code. The image may include a sign with the particular symbol or code. The processor 145 may be programmed to determine that the host vehicle 100 is the lead vehicle if the image contains the particular symbol or code. In some instances, the processor 145 may be programmed to command the camera 120 to capture the image. The processor 145 may command the camera 120 to capture the image in response to, e.g., a user input received at the host vehicle 100 via, e.g., a user interface located in the passenger compartment of the host vehicle 100 or via a mobile device carried by the user and wirelessly transmitted to the host vehicle 100 and received at the host vehicle 100 via the communication system 115. Rather than rely on an image, the processor 145 may determine that the host vehicle 100 is the lead vehicle based on the user input.

To allow the host vehicle 100 to operate as the lead vehicle, the processor 145 may be programmed to command the tail lamps 165 to flash a predetermined pattern. Commanding the tail lamps 165 to flash may include the processor 145 outputting a signal to the lighting system controller 170. The signal output by the processor 145 may cause the lighting system controller 170 to output control signals to the tail lamps 165 to flash according to a predetermined pattern. The processor 145 may further be programmed to wait for a response from the vehicle immediately behind the host vehicle 100. That is, the processor 145 may be programmed to receive and process images captured by the camera 120 located at the rear of the host vehicle 100. The processor 145 may be programmed to identify whether the vehicle immediately behind the host vehicle 100 responded by flashing its headlamps or other front lamps 155.

The processor 145 may be programmed to wait for the response for a predetermined amount of time. The predetermined amount of time may be on the order of, e.g., 5-30 seconds. The processor 145 may be programmed to allow the host vehicle 100 to proceed to the loading area upon receipt of the response within the predetermined amount of time. The processor 145 may do so by commanding the autonomous mode controller 130 to navigate the host vehicle 100 to the loading area. The processor 145 may be programmed to determine if a vehicle immediately behind the host vehicle 100 is present if no response is received within the predetermined amount of time. The processor 145 may do so by processing images captured by the camera 120. The processor 145 may be programmed to operate the host vehicle 100 as the last vehicle in the row if no follow vehicle is present.

The processor 145 may be programmed to report an issue with the vehicle immediately behind it if the response is not received in the predetermined amount of time and if the processor 145 confirms that the vehicle immediately behind it is present. Reporting the issue may include the processor 145 being programmed to command the communication system 115 to transmit a notification to the service center 110. The notification may indicate that the vehicle immediately behind the host vehicle 100 is unable to proceed to the loading area. Prior to sending the notification to the service center 110, the processor 145 may be programmed to attempt to communicate with the vehicle immediately behind it via, e.g., a vehicle-to-vehicle communication protocol such as DSRC. The communication with the other vehicle may allow the processor 145 to determine what is wrong with the other vehicle. The processor 145 may command the communication system 115 to include such information in the notification to the service center 110.

Further, the processor 145 may determine that the malfunctioning vehicle immediately behind the host vehicle 100 is blocking other vehicles from proceeding to the loading area. In this instance, the processor 145 may be programmed to operate the host vehicle 100 as the last vehicle in the row.

To allow the host vehicle 100 to operate as the follow vehicle, the processor 145 may be programmed to determine that it is a follow vehicle by processing images captured by the camera 120. That is, the processor 145 may be programmed to determine that the host vehicle 100 is a follow vehicle as a result of the processor 145 determining that a vehicle is present ahead of the host vehicle 100. The processor 145 may be programmed to receive and process images captured by a camera 120 with a view ahead of the host vehicle 100. The processor 145 may be programmed to process the images to determine if the vehicle immediately ahead of the host vehicle 100 is flashing its tail lamps 165 at the host vehicle 100 according to a predetermined pattern. The processor 145 may be programmed to respond by commanding the lighting system controller 170 to flash the front lamps 155 of the host vehicle 100 according to a predetermined pattern that may be the same or different from the sequence flashed by the vehicle immediately ahead of the host vehicle 100.

The processor 145 may be further programmed to flash the tail lamps 165 of the host vehicle 100 to a vehicle immediately behind the host vehicle 100. That is, the processor 145 may be programmed to command the tail lamps 165 to flash a predetermined pattern. Commanding the tail lamps 165 to flash may include the processor 145 outputting a signal to the lighting system controller 170. The signal output by the processor 145 may cause the lighting system controller 170 to output control signals to the tail lamps 165 to flash according to a predetermined pattern. The processor 145 may further be programmed to wait for a response from the vehicle immediately behind the host vehicle 100. That is, the processor 145 may be programmed to receive and process images captured by the camera 120 located at the rear of the host vehicle 100. The processor 145 may be programmed to identify whether the vehicle immediately behind the host vehicle 100 responded by flashing its headlamps or other front lamps 155.

The processor 145 may be programmed to wait for the response for a predetermined amount of time. The predetermined amount of time may be on the order of, e.g., 5-30 seconds. The processor 145 may be programmed to allow the host vehicle 100 to proceed to the loading area upon receipt of the response within the predetermined amount of time. The processor 145 may do so by commanding the autonomous mode controller 130 to navigate the host vehicle 100 to the loading area. The processor 145 may be programmed to determine if a vehicle immediately behind the host vehicle 100 is present if no response is received within the predetermined amount of time. The processor 145 may do so by processing images captured by the camera 120. The processor 145 may be programmed to operate the host vehicle 100 as the last vehicle in the row if no follow vehicle is present.

The processor 145 may be programmed to report an issue with the vehicle immediately behind it if the response is not received in the predetermined amount of time and if the processor 145 confirms that the vehicle immediately behind it is present. Reporting the issue may include the processor 145 being programmed to command the communication system 115 to transmit a notification to the service center 110. The notification, which may include the location of the host vehicle 100, the malfunctioning vehicle, or both, may indicate that the vehicle immediately behind the host vehicle 100 is unable to proceed to the loading area. Prior to sending the notification to the service center 110, the processor 145 may be programmed to attempt to communicate with the vehicle immediately behind it via, e.g., a vehicle-to-vehicle communication protocol such as DSRC. The communication with the other vehicle may allow the processor 145 to determine what is wrong with the other vehicle. The processor 145 may command the communication system 115 to include such information in the notification to the service center 110.

Further, the processor 145 may determine that the malfunctioning vehicle immediately behind the host vehicle 100 is blocking other vehicles from proceeding to the loading area. In this instance, the processor 145 may be programmed to operate the host vehicle 100 as the last vehicle in the row.

To allow the host vehicle 100 to operate as the last vehicle in a row, the processor 145 may be programmed to operate as a follow vehicle or a lead vehicle, as discussed above. Further, the processor 145 may be programmed to determine whether another vehicle is behind the host vehicle 100 in the row. The processor 145 may be further programmed to determine whether a vehicle behind the host vehicle 100 has malfunctioned. In these instances, the processor 145 may be programmed to begin operating as the lead vehicle.

Operating as the lead vehicle may include the processor 145 being programmed to determine if an adjacent row of vehicles is present relative to the host vehicle 100. Determining whether an adjacent row is present may include the processor 145 being programmed to receive and process images captured by a camera 120 with a view of an area adjacent the host vehicle 100. The processor 145 may be programmed to detect the adjacent row if, e.g., the processor 145 determines that other vehicles are present in the image of the area adjacent to the host vehicle 100. The processor 145 may be programmed to command the autonomous mode controller 130 to navigate the host vehicle 100 to the front of the adjacent row. Then, the processor 145 may operate the host vehicle 100 as the lead vehicle of that row before proceeding to the loading area. The processor 145 may be further programmed to command the autonomous mode controller 130 to navigate the host vehicle 100 to the loading area if no adjacent row is detected.

FIGS. 3A-3F illustrate a scenario in a parking lot where autonomous vehicles equipped with the self-loading sequence system 105 proceed to the loading area according to a particular sequence. The example shown in FIGS. 3A-3F is simplified for purposes of clarity and conciseness. Further, the numbers in the circles in FIGS. 3A-3F indicate an example order of events.

Figure 3A:
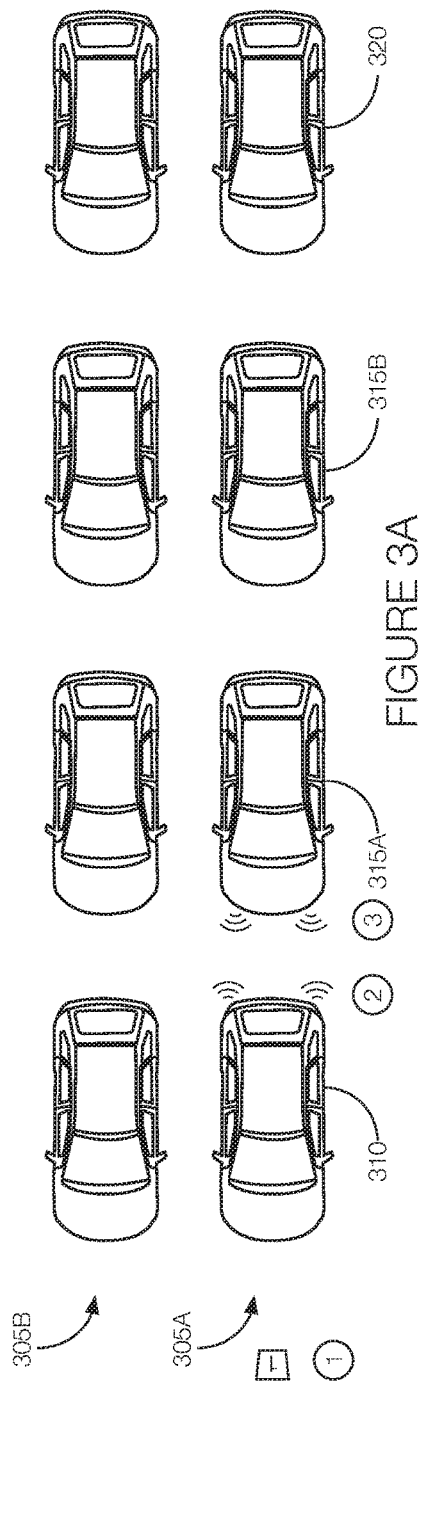

FIG. 3A shows two rows of vehicles, referred to as a first row 305A and a second row 305B. The first row 305A includes a lead vehicle 310, two follow vehicles 315A and 315B, and one last vehicle 320. A sign 325 is presented to the lead vehicle 310 of the first row 305A. The lead vehicle 310 flashes its tail lamps 165 toward a first follow vehicle 315A, which is immediately behind the lead vehicle 310. The first follow vehicle 315A responds by flashing its front lamps 155 toward the lead vehicle 310.

Figure 3B:
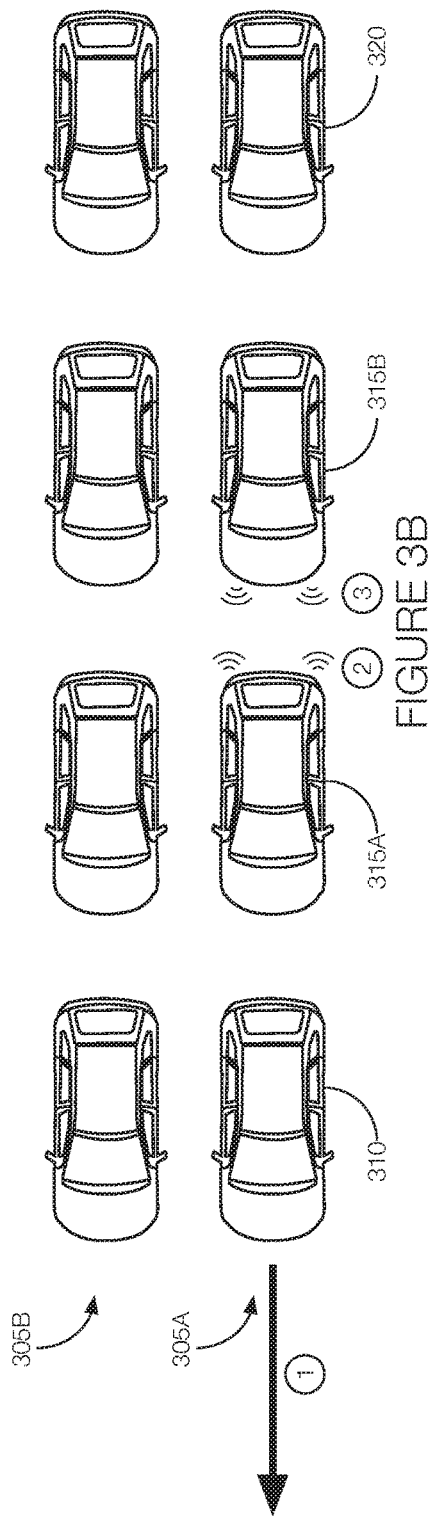

As shown in FIG. 3B, the lead vehicle 310 proceeds to the loading area after receiving the response from the first follow vehicle 315A. Also shown in FIG. 3B, the first follow vehicle 315A flashes its tail lamps 165 toward the second follow vehicle 315B and receives a response from the second follow vehicle 315B.

As shown in FIG. 3C, the first follow vehicle 315A proceeds to the loading area after it receives a response from the second follow vehicle 315B. The response, as discussed above, includes the second follow vehicle 315B flashing its front lamps 155 toward the first follow vehicle 315A. Further, the second follow vehicle 315B flashes its tail lamps 165 toward the last vehicle 320 in the first row 305A. The second follow vehicle 315B waits for the last vehicle 320 to respond.

Referring now to FIG. 3D, upon receipt of the response from the last vehicle 320, the second follow vehicle 315B proceeds to the loading area. The last vehicle 320 confirms that it is the last vehicle 320 in the first row 305A.

Referring now to FIG. 3E, the last vehicle 320 then proceeds to the front of the second row 305B where it can serve as the lead vehicle 320 of the second row 305B. The lead vehicle 320 of the second row 305B (formerly the last vehicle 320 of the first row 305A) flashes its tail lamps 165 toward the third follow vehicle 315C, which is the follow vehicle immediately behind the lead vehicle 320 in the second row. The lead vehicle 320 of the second row 305B proceeds to the loading area after the third follow vehicle 315C responds by flashing its front lamps 155 toward the lead vehicle 320.

As shown in FIG. 3F, the third follow vehicle 315C flashes its tail lamps 165 toward a fourth follow vehicle 315D, which is the follow vehicle immediately behind the third follow vehicle 315B. The fourth follow vehicle 315D does not respond, however, within the predetermined amount of time. Therefore, the third follow vehicle 315C sends a notification to the service center 110 to have the fourth follow vehicle 315D investigated for a potential malfunction. The third follow vehicle 315C confirms that that fourth follow vehicle 315D prevents the other vehicles in the second row 305B from proceeding to the loading area. Therefore, the third follow vehicle 315C looks for an adjacent row. After concluding that there is no adjacent row, the third follow vehicle 315C proceeds to the loading area. If an adjacent row had been present, the third follow vehicle 315C would have navigated to the front of that row to serve as the lead vehicle of that row.

Figure 4:
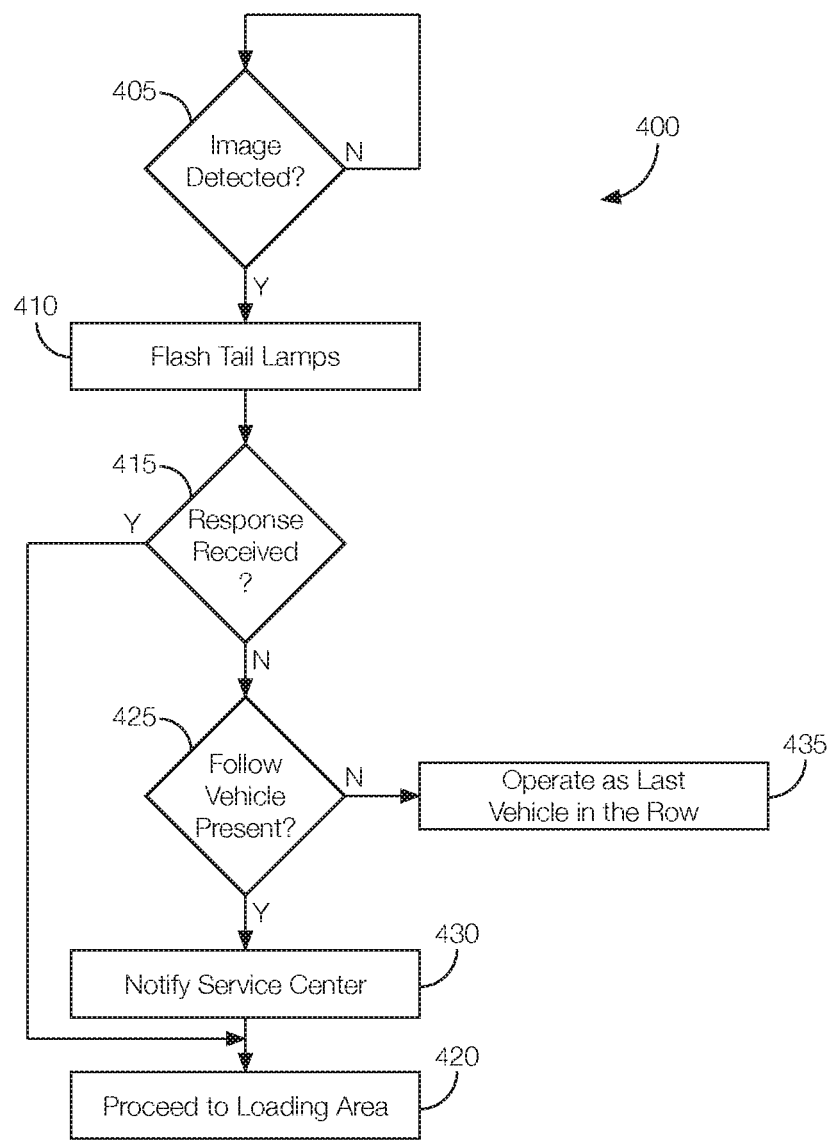
FIG. 4 is a flowchart of an example process that may be executed by the self-loading sequence system of a lead autonomous vehicle.

FIG. 4 is a flowchart of an example process 400 that may be executed by the self-loading sequence system 105 of a host vehicle 100 serving as the lead vehicle in a row of vehicles.

At decision block 405, the self-loading sequence system 105 determines if a sign with a particular symbol or code is present in front of the host vehicle 100. As discussed above, the processor 145 may process images captured by the camera 120 to determine if the sign with the code or symbol is located ahead of the host vehicle 100. If so, the process 400 may proceed to block 410. If not, the process 400 may continue to execute block 405 until the sign is placed ahead of the host vehicle 100.

At block 410, the self-loading sequence system 105 flashes the tail lamps 165 of the host vehicle 100. The processor 145 may flash the tail lamps 165 by commanding the lighting system controller 170 to output signals to one or more tail lamps 165 of the host vehicle 100. The signals may cause the tail lamps 165 to flash according to a predetermined pattern. The predetermined pattern may signal a follow vehicle immediately behind the host vehicle 100 that the follow vehicle is next in line to proceed to the loading area.

At block 415, the self-loading sequence system 105 determines if a response was received from the follow vehicle immediately behind the host vehicle 100. As discussed above, the response may be in the form of the follow vehicle immediately behind the host vehicle 100 flashing its front lamps 155 in a predetermined pattern toward the host vehicle 100. Thus, the processor 145 may process images captured by the camera 120 to determine if the follow vehicle immediately behind the host vehicle 100 has flashed its front lamps 155 according to the pattern. In some instances, the processor 145 may determine whether the response was received within a predetermined amount of time. The predetermined amount of time may be on the order of, e.g., 5-30 seconds. The processor 145 may wait the predetermined amount of time to give the follow vehicle immediately behind the host vehicle 100 time to respond to the signal sent at block 410. If the response is received within the predetermined amount of time, the process 400 may proceed to block 420. If no response is received within the predetermined amount of time, the process 400 may proceed to block 425.

At block 420, the self-loading sequence system 105 allows the host vehicle 100 to proceed to the loading area. The processor 145, for instance, may command the autonomous to navigate the host vehicle 100 to the loading area. The process 400 may end after block 420.

At decision block 425, the self-loading sequence system 105 determines if a follow vehicle is located behind the host vehicle 100. The processor 145 may determine whether the follow vehicle is present behind the host vehicle 100 based on images captured by a camera 120 with a view of an area behind the host vehicle 100. If the processor 145 determines that a vehicle is present behind the host vehicle 100, the process 400 may proceed to block 430. If no vehicle is behind the host vehicle 100, the process 400 may proceed to block 435.

At block 430, the self-loading sequence system 105 notifies the service center 110 of a possible vehicle malfunction. The processor 145 may do so by commanding the communication system 115 to transmit a notification to the service center 110. The notification, which may include the location of the host vehicle 100, the malfunctioning vehicle, or both, may indicate that the vehicle immediately behind the host vehicle 100 is unable to proceed to the loading area. Prior to sending the notification to the service center 110, the processor 145 command the communication system 115 to attempt to communicate with the vehicle immediately behind it via, e.g., a vehicle-to-vehicle communication protocol such as DSRC. The communication with the other vehicle may allow the processor 145 to determine what is wrong with the other vehicle. The processor 145 may command the communication system 115 to include such information, if received, in the notification to the service center 110. The process 400 may proceed to block 420 so the host vehicle 100 can proceed to the loading area. In one alternative approach, such as if the processor 145 determines that the malfunctioning vehicle is preventing the other vehicles in the row from proceeding to the loading area, the process 400 may proceed to block 435.

At block 435, the self-loading sequence system 105 operates as the last vehicle in the row. That is, the processor 145 controls the host vehicle 100 as if it is the last vehicle in the row by, e.g., executing the process 600, discussed below with reference to FIG. 6.

Figure 5:
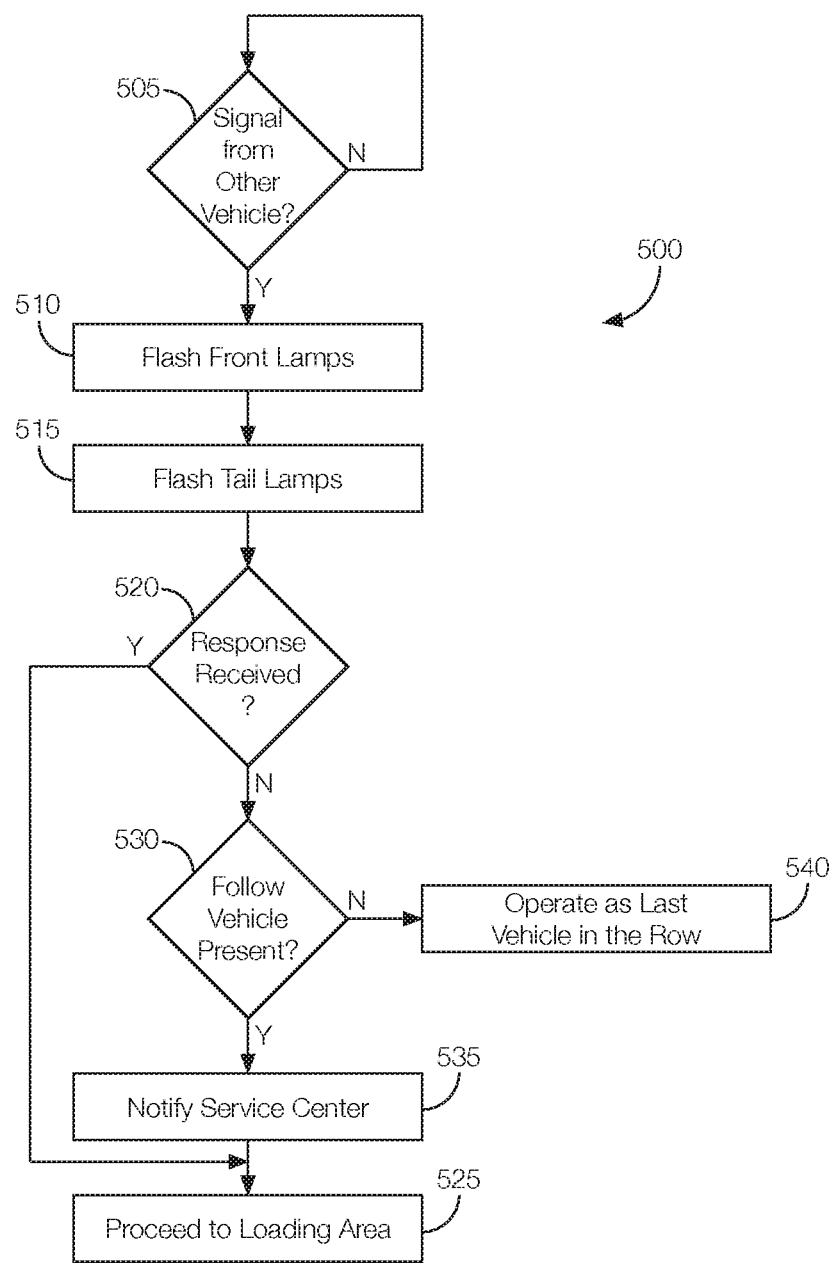
FIG. 5 is a flowchart of an example process that may be executed by the self-loading sequence system of a follower autonomous vehicle.

FIG. 5 is a flowchart of an example process 500 that may be executed by the self-loading sequence system 105 of a host vehicle 100 serving as a follower vehicle in a row of autonomous vehicles.

At decision block 505, the self-loading sequence system 105 determines if a signal from the vehicle immediately ahead of the host vehicle 100 has been received. The signal may be in the form of the vehicle immediately ahead of the host vehicle 100 flashing its tail lamps 165 at the host vehicle 100. Thus, determining if the signal has been received may include the processor 145 processing images captured by a camera 120 with a view ahead of the host vehicle 100. If the processor 145 determines that the vehicle immediately ahead of the host vehicle 100 is flashing its tail lamps 165 in a predetermined pattern, the process 500 may proceed to block 510. Otherwise, block 505 may be repeated.

At block 510, the self-loading sequence system 105 flashes the front lamps 155 of the host vehicle 100 in a predetermined pattern. The processor 145 may command the lighting system controller 170 to flash the front lamps 155 of the host vehicle 100 in the predetermined pattern to signal to the vehicle immediately ahead of the host vehicle 100 that the host vehicle 100 received the signal at block 505.

At block 515, the self-loading sequence system 105 flashes the tail lamps 165 of the host vehicle 100. The processor 145 may flash the tail lamps 165 by commanding the lighting system controller 170 to output signals to one or more tail lamps 165 of the host vehicle 100. The signals may cause the tail lamps 165 to flash according to a predetermined pattern. The predetermined pattern may signal a follow vehicle immediately behind the host vehicle 100 that the follow vehicle is next in line to proceed to the loading area.

At block 520, the self-loading sequence system 105 determines if a response was received from the follow vehicle immediately behind the host vehicle 100. As discussed above, the response may be in the form of the follow vehicle immediately behind the host vehicle 100 flashing its front lamps 155 in a predetermined pattern toward the host vehicle 100. Thus, the processor 145 may process images captured by the camera 120 to determine if the follow vehicle immediately behind the host vehicle 100 has flashed its front lamps 155 according to the pattern. In some instances, the processor 145 may determine whether the response was received within a predetermined amount of time. The predetermined amount of time may be on the order of, e.g., 5-30 seconds. The processor 145 may wait the predetermined amount of time to give the follow vehicle immediately behind the host vehicle 100 time to respond to the signal sent at block 515. If the response is received within the predetermined amount of time, the process 500 may proceed to block 525. If no response is received within the predetermined amount of time, the process 500 may proceed to block 530.

At block 525, the self-loading sequence system 105 allows the host vehicle 100 to proceed to the loading area. The processor 145, for instance, may command the autonomous to navigate the host vehicle 100 to the loading area. The process 500 may end after block 525.

At decision block 530, the self-loading sequence system 105 determines if a follow vehicle is located behind the host vehicle 100. The processor 145 may determine whether the follow vehicle is present behind the host vehicle 100 based on images captured by a camera 120 with a view of an area behind the host vehicle 100. If the processor 145 determines that a vehicle is present behind the host vehicle 100, the process 500 may proceed to block 535. If no vehicle is behind the host vehicle 100, the process 500 may proceed to block 540.

At block 535, the self-loading sequence system 105 notifies the service center 110 of a possible vehicle malfunction. The processor 145 may do so by commanding the communication system 115 to transmit a notification to the service center 110. The notification, which may include the location of the host vehicle 100, the malfunctioning vehicle, or both, may indicate that the vehicle immediately behind the host vehicle 100 is unable to proceed to the loading area. Prior to sending the notification to the service center 110, the processor 145 command the communication system 115 to attempt to communicate with the vehicle immediately behind it via, e.g., a vehicle-to-vehicle communication protocol such as DSRC. The communication with the other vehicle may allow the processor 145 to determine what is wrong with the other vehicle. The processor 145 may command the communication system 115 to include such information, if received, in the notification to the service center 110. The process 500 may proceed to block 525 so the host vehicle 100 can proceed to the loading area. In one alternative approach, such as if the processor 145 determines that the malfunctioning vehicle is preventing the other vehicles in the row from proceeding to the loading area, the process 500 may proceed to block 540.

At block 540, the self-loading sequence system 105 operates as the last vehicle in the row. That is, the processor 145 controls the host vehicle 100 as if it is the last vehicle in the row by, e.g., executing the process 600, discussed below with reference to FIG. 6.

Figure 6:
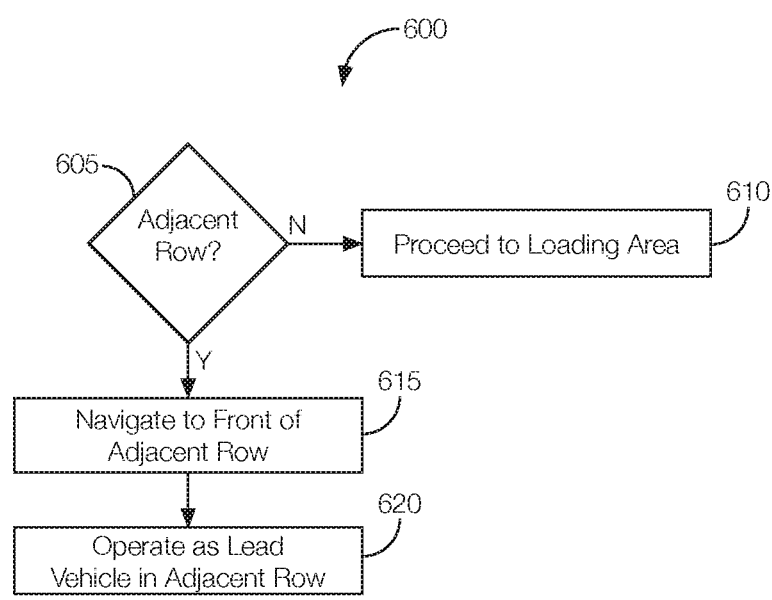
FIG. 6 is a flowchart of an example process that may be executed by the self-loading sequence system of a follower autonomous vehicle located at the end of a row.

FIG. 6 is a flowchart of an example process 600 that may be executed by the self-loading sequence system 105 of a host vehicle 100 operating as the last vehicle in a row.

At decision block 605, the self-loading sequence system 105 determines whether there is an adjacent row relative to the host vehicle 100. The processor 145 may detect the adjacent row based on images captured by a camera 120 with a view of an area adjacent to the host vehicle 100. The processor 145 may determine that the adjacent row has vehicles if, e.g., the processor 145 determines that other vehicles are present in the image of the area adjacent to the host vehicle 100 captured by the camera 120. If there are vehicles in the adjacent row, the process 600 may proceed to block 610. If not, the process 600 may proceed to block 620.

At block 610, the self-loading sequence system 105 allows the host vehicle 100 to proceed to the front of the adjacent row identified at block 605. The processor 145, for instance, may command the autonomous to navigate the host vehicle 100 to the front of the adjacent row.

At block 615, the self-loading sequence system 105 operates the host vehicle 100 as the first vehicle in the adjacent row. That is, the processor 145 may control the host vehicle 100 as though the host vehicle 100 is the lead vehicle in the adjacent row by, e.g., executing the process 400, discussed above with reference to FIG. 4 after arriving at the front of the adjacent row. In some instances, the processor 145 may skip block 450 and instead proceed directly to block 410 when proceeding to the process 400 from block 610.

At block 620, the self-loading sequence system 105 allows the host vehicle 100 to proceed to the loading area. The processor 145, for instance, may command the autonomous to navigate the host vehicle 100 to the loading area. The process 600 may end after block 620.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
    a memory; and
    a processor programmed to execute instructions stored in the memory, the instructions including:
        commanding a lighting system controller to flash tail lamps of a host vehicle;
        determining whether a response was received from a first follow vehicle located behind the host vehicle; and
        commanding the host vehicle to autonomously proceed to a loading area as a result of receiving the response from the first follow vehicle.

2. The vehicle computer of claim 1, wherein the instructions further include detecting a sign with a code or symbol and determining that the host vehicle is a lead vehicle in a row of vehicles upon detecting the sign.

3. The vehicle computer of claim 2, wherein the instructions include commanding the lighting system controller to flash the tail lamps of the host vehicle toward the first follow vehicle after detecting the sign.

4. The vehicle computer of claim 1, wherein receiving the response from the first follow vehicle includes receiving an image captured by a camera of the host vehicle and processing the image.

5. The vehicle computer of claim 4, wherein the instructions further include determining, as a result of processing the image, that the first follow vehicle responded by flashing its front lamps in a predetermined pattern.

6. The vehicle computer of claim 1, wherein the instructions further include waiting a predetermined amount of time for the response from the first follow vehicle and determining whether the first follow vehicle did not respond within the predetermined amount of time.

7. The vehicle computer of claim 6, wherein the instructions further include transmitting a notification to a service center indicating that the follow vehicle is unable to proceed to a loading area as a result of determining that the first follow vehicle did not respond within the predetermined amount of time.

8. The vehicle computer of claim 7, wherein the instructions further include commanding the host vehicle to autonomously proceed to the loading area after transmitting the notification.

9. The vehicle computer of claim 1, wherein the instructions further include confirming whether the first follow vehicle is located behind the host vehicle.

10. The vehicle computer of claim 9, wherein confirming whether the first follow vehicle is located behind the host vehicle includes determining whether the first follow vehicle is located behind the host vehicle based on images captured by a camera of the host vehicle with a view of an area behind the host vehicle.

11. The vehicle computer of claim 9, wherein the instructions further include determining that the host vehicle is last in a row of vehicles if the first follow vehicle is not located behind the host vehicle.

12. The vehicle computer of claim 11, wherein the instructions further include detecting whether an adjacent row of vehicles is present next to the host vehicle if the first follow vehicle is not located behind the host vehicle.

13. The vehicle computer of claim 12, wherein the instructions further include commanding the host vehicle to autonomously navigate to a front of the adjacent row of vehicles after detecting the adjacent row of vehicles.

14. The vehicle computer of claim 13, wherein the instructions further include commanding the lighting system controller of the host vehicle to flash the tail lamps of the host vehicle toward a second follow vehicle in the adjacent row of vehicles after arriving at the front of the adjacent row of vehicles.

15. The vehicle computer of claim 14, wherein the instructions further including waiting for a response from the second follow vehicle in the adjacent row of vehicles.

16. The vehicle computer of claim 15, wherein the instructions further include detecting the response from the second follow vehicle within a predetermined amount of time.

17. The vehicle computer of claim 16, wherein the instructions further include commanding the host vehicle to autonomously proceed to a loading area upon receipt of the response from the second follow vehicle.

* * * * *